US010353092B2

(12) United States Patent
Crawley et al.

(10) Patent No.: US 10,353,092 B2
(45) Date of Patent: Jul. 16, 2019

(54) VELOCITY MODEL UPDATE WITH AN INVERSION GRADIENT

(71) Applicant: PGS Geophysical AS, Oslo (NO)

(72) Inventors: Sean Crawley, Houston, TX (US); Jaime Ramos-Martinez, Houston, TX (US); Alejandro Antonio Valenciano Mavilio, Houston, TX (US); Nizar Chemingui, Houston, TX (US)

(73) Assignee: PGS Geophysical AS, Oslo (NO)

( * ) Notice: Subject to any disclaimer, the term of this patent is extended or adjusted under 35 U.S.C. 154(b) by 230 days.

(21) Appl. No.: 15/364,585

(22) Filed: Nov. 30, 2016

(65) Prior Publication Data

US 2017/0168178 A1 Jun. 15, 2017

Related U.S. Application Data

(60) Provisional application No. 62/265,657, filed on Dec. 10, 2015.

(51) Int. Cl.
*G01V 1/28* (2006.01)
*G01V 1/30* (2006.01)
*G01V 1/38* (2006.01)

(52) U.S. Cl.
CPC .............. *G01V 1/303* (2013.01); *G01V 1/282* (2013.01); *G01V 1/306* (2013.01); *G01V 1/38* (2013.01); *G01V 2210/614* (2013.01); *G01V 2210/67* (2013.01)

(58) Field of Classification Search
CPC .......... G01V 1/28; G01V 1/282; G01V 1/303; G01V 1/005; G01V 1/306; G01V 1/38
USPC ......................... 702/11, 14, 16, 6, 18; 367/7
See application file for complete search history.

(56) References Cited

U.S. PATENT DOCUMENTS

| | | | | |
|---|---|---|---|---|
| 5,235,555 | A | 8/1993 | Albertin | |
| 5,798,982 | A * | 8/1998 | He | G01V 1/306 367/28 |
| 8,395,965 | B2 | 3/2013 | Thomson | |
| 9,158,017 | B2 | 10/2015 | Shin | |
| 2006/0190179 | A1 * | 8/2006 | Herrmann | G01V 1/28 702/14 |
| 2008/0109168 | A1 * | 5/2008 | Koren | G01V 1/32 702/16 |

(Continued)

FOREIGN PATENT DOCUMENTS

WO 2016154404 9/2016

OTHER PUBLICATIONS

Sirgue, Laurent, and Prattz, R. Gerhard. "Efficient waveform inversion and imaging: A strategy for selecting temporal frequencies." Geophysics, vol. 69, No. 1, Jan.-Feb. 2004, pp. 231-248. (Year: 2004).*

(Continued)

*Primary Examiner* — John E Breene
*Assistant Examiner* — Jeffrey P Aiello

(57) ABSTRACT

The present disclosure is related to a velocity model update with a full waveform inversion gradient. At least one method can include updating a velocity model of a subsurface, which can include suppressing high wavenumber components of the velocity model provided by reflected energy with a decomposed full waveform inversion gradient. Low wavenumber components can be preserved in the velocity model.

16 Claims, 8 Drawing Sheets

(56) References Cited

U.S. PATENT DOCUMENTS

| | | | | |
|---|---|---|---|---|
| 2011/0295510 | A1* | 12/2011 | Gulati | G01V 1/28<br>702/16 |
| 2012/0069713 | A1* | 3/2012 | Geerits | G01V 1/48<br>367/99 |
| 2012/0120767 | A1* | 5/2012 | Vu | G01V 1/46<br>367/31 |
| 2012/0218861 | A1* | 8/2012 | Xia | G01V 1/303<br>367/73 |
| 2013/0238249 | A1 | 9/2013 | Sheng et al. | |
| 2013/0311149 | A1 | 11/2013 | Tang et al. | |
| 2014/0372043 | A1* | 12/2014 | Hu | G01V 1/303<br>702/16 |
| 2016/0077231 | A1* | 3/2016 | Rohnke | G01V 1/364<br>367/7 |
| 2016/0187514 | A1* | 6/2016 | Dellinger | G01V 1/282<br>367/24 |

OTHER PUBLICATIONS

Virieux, et al., "An Overview of Full-Waveform Inversion in Exploration Geophysics"; Geophysics, vol. 74, No. 6 (Nov.-Dec. 2009), 15 Figs, 1 Table, (26 pgs).

Sirgue, et al., "Efficient Waveform Inversion and Imaging: A strategy for Selecting Temporal Frequencies"; Geophysics, vol. 69, No. 1 (Jan.-Feb. 2004), 16 Figs, 1 Table, (18 pgs).

International Search Report & Written Opinion for related European PCT Application PCT/EP2016/080530, dated Apr. 4, 2017 (15 pgs).

International Preliminary Report on Patentability for related PCT Application PCT/EP2016/080530, dated Jun. 21, 2018 (9 pgs).

Douma, et al., "On the connection between artefact filtering in reverse-time migration and adjoint tomography"; (Sep. 14, 2010) (15 pgs) http://www.cwp.mines.edu/~huub/pubs/hdouma_rtm_and_adjoint_v4.pdf.

Macedo, et al., "Scattering-based decomposition of sensitivity kernels for full-waveform inversion"; Sociedade Brasileira de Geofisica, Twelfth International Congress of the Brazilian Geophysical Society, (Aug. 15-18, 2011) (6 pgs) http://www.slb.com/~/media/Files/technical_papers/300/3131.pdf.

Alkhalifah, "Conditioning the full waveform inversion gradient to welcome anisotropy"; Center for Wave Phenomena Colorado School of Mines (Apr. 21, 2014) (24 pgs) http://cwp.mines.edu/Documents/cwpreports/cwp790R.pdf.

Ma, "Full waveform inversion with image-guided gradient"; Master of Science Thesis; Geophysics, Center for Wave Phenomena Colorado School of Mines (May 12, 2010) (57 pgs) http://cwp.mines.edu/Documents/cwpreports/cwp-674.pdf.

PGS, "A Clearer Image, Reverse Time Migration" (Jan. 20, 2016) (7 pgs) https://www.pgs.com/imaging/tools-and-techniques/advanced-migration-solutions-rtm-wei/technology/reverse-time-migration/.

Douma, et al., "On the connection between artifact filtering in reverse-time migration and adjoint tomography", Geophysics,vol. 75, No. 6 (Nov.-Dec. 2010) (5 pgs).

Tarantola, "Inversion of Seismic Reflection Data in the Acoustic Approximation", Geophysics, vol. 49, No. 8 (Aug. 1984); (8 pgs).

Whitmore, et al., "Applications of RTM inverse scattering imaging conditions", SEG Las Vegas 2012 Annual Meeting (6 pgs).

Luo, et al., "Seismic modeling and imaging based upon spectral-element and adjoint methods", Special Section: Seismic Modeling: The Leading Edge (May 2009) (6 pgs).

Tromp, et al., "Seismic tomography, adjoint methods, time reversal and banana-doughnut kernels", Geophysics J. Int. (2005) vol. 160 (22 pgs).

Ramos-Martinez, et al., "A robust FWI gradient for high-resolution velocity model building", SEG International Exposition and 86th Annual Meeting (Sep. 30, 2016) (5 pgs).

* cited by examiner

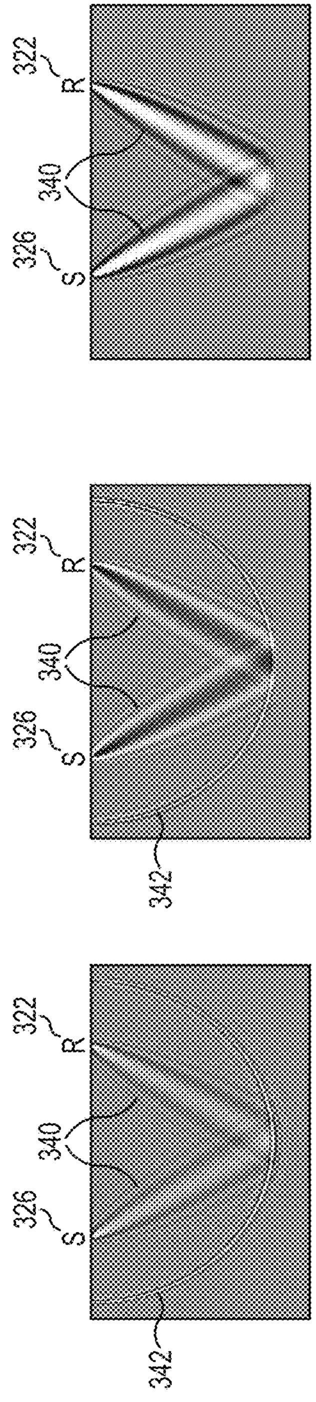
Fig. 3A
Fig. 3B
Fig. 3C
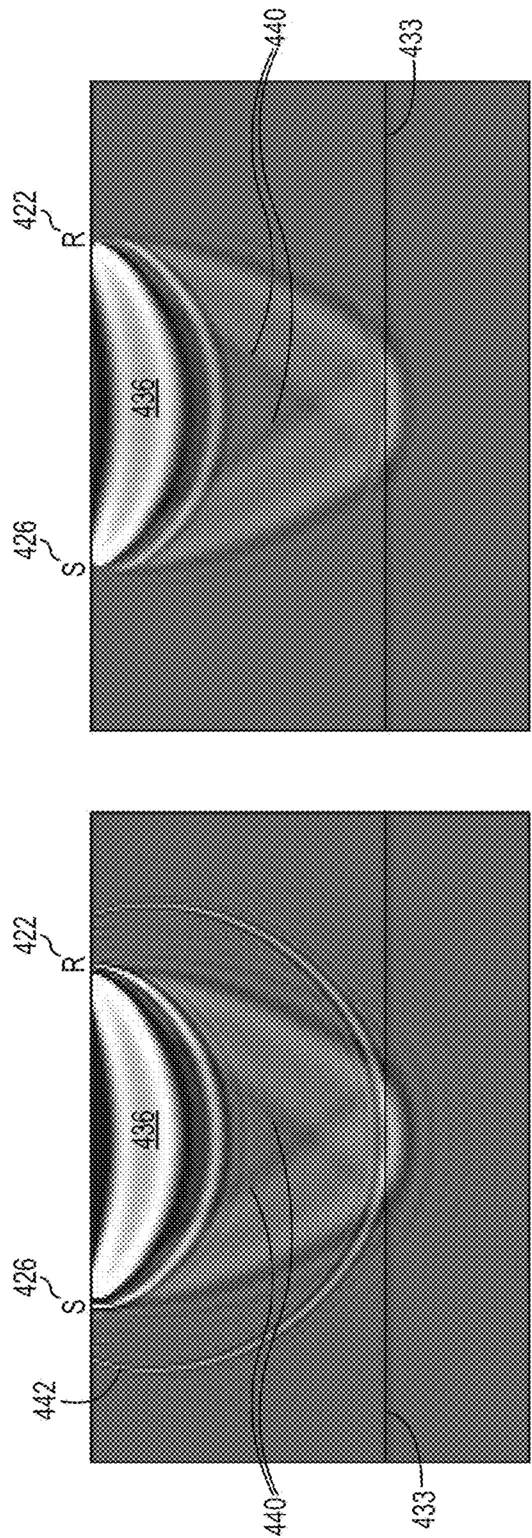
Fig. 4A
PRIOR ART
Fig. 4B

758
DEPTH (km)
2.0
4.5
7.0

757

759

760

762

VELOCITY MODEL UPDATE WITH AN INVERSION GRADIENT

CROSS-REFERENCE TO RELATED APPLICATIONS

This application claims priority to U.S. Provisional Application 62/265,657, filed Dec. 10, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as hydrocarbons. High-resolution images of a subterranean formation are helpful for quantitative interpretation and improved reservoir monitoring. For a typical marine survey, a marine survey vessel tows one or more seismic sources below the sea surface and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine survey equipment, such as navigation control, seismic source control, seismic receiver control, and recording equipment. The seismic source control may cause the one or more seismic sources, which can be air guns, marine vibrators, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The seismic receivers thereby measure a wavefield that was initiated by the actuation of the seismic source.

BRIEF DESCRIPTION OF THE DRAWINGS

FIG. 3A illustrates a full waveform inversion gradient, which is used to produce a velocity update, computed from a bulk modulus sensitivity kernel.

FIG. 3B illustrates a full waveform inversion gradient computed using a density sensitivity kernel for the same model as FIG. 3A.

FIG. 3C illustrates a full waveform inversion gradient produced with a dynamically weighted velocity sensitivity kernel for the same model as FIGS. 3A and 3B.

FIG. 4A illustrates a full waveform inversion gradient computed according to some previous approaches.

FIG. 4B illustrates a gradient computed using a dynamically weighted velocity sensitivity kernel.

DETAILED DESCRIPTION

Figure 1:
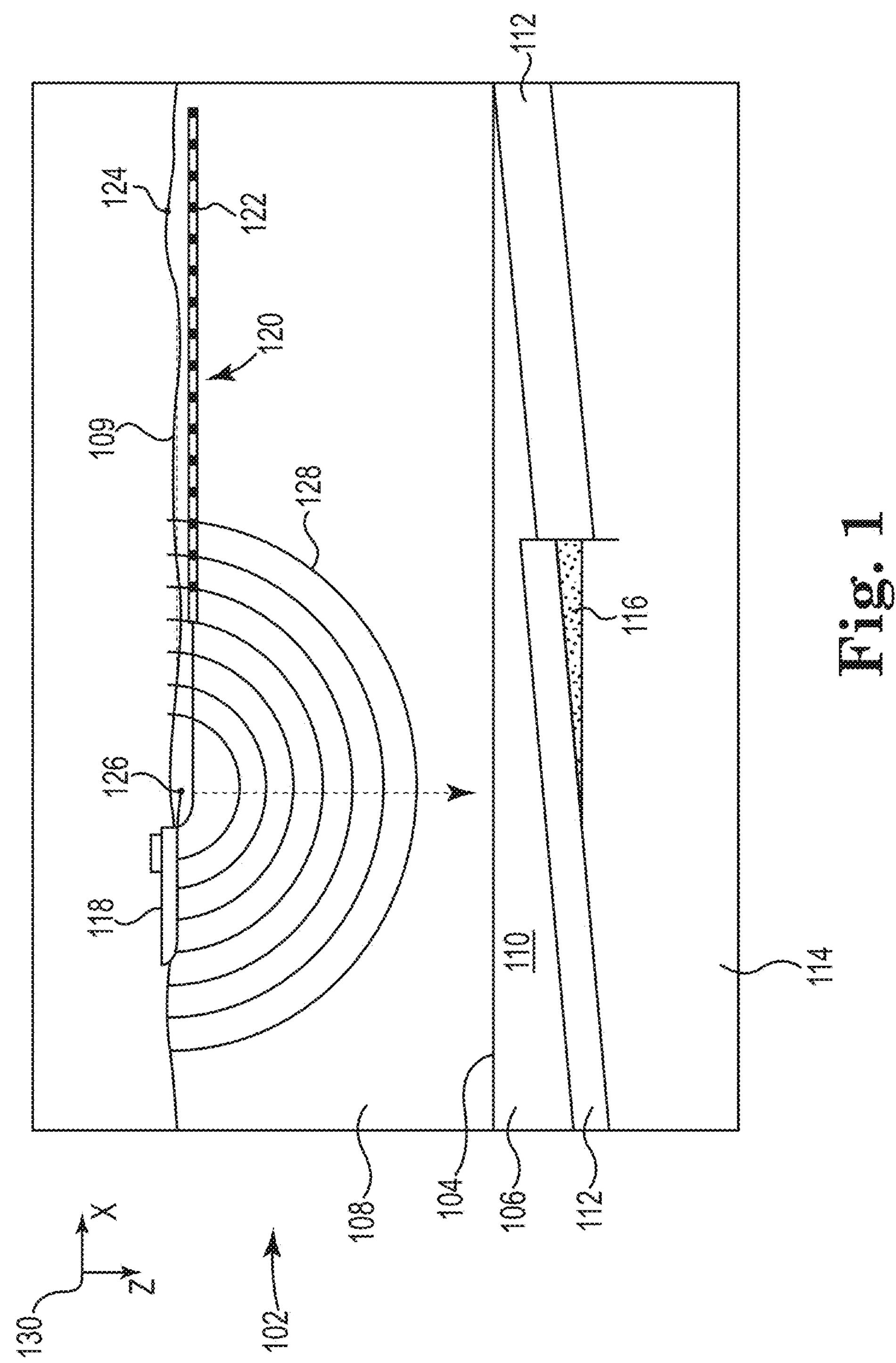
FIG. 1 illustrates an elevation or xz-plane view of marine surveying in which signals are emitted by a source for recording by receivers for processing and analysis in order to help characterize the structures and distributions of features and materials underlying the surface of the earth.

The present disclosure is related to a velocity model update with a full waveform inversion (FWI) gradient. A velocity model is a map of the subsurface indicating velocities of waves at various locations in the subsurface. FWI is a non-linear data-fitting procedure that aims at obtaining detailed estimates of subsurface properties from seismic data. In FWI, given an initial guess of subsurface parameters, a model is predicted by solving a wave equation, which is then updated in order to reduce the misfit between the observed and predicted data; this is repeated iteratively until the data misfit is sufficiently small. FWI can be used to build high resolution velocity models in shallow water settings where recorded refracted energy can help resolve small scale geologic features down to the deepest turning point of the refracted energy. For deeper targets, such as those deeper than 3-5 kilometers (km), FWI may use reflected energy to update the velocity model. By using gradient computations according to some previous approaches, FWI may not be able to update low wavenumber components of the velocity model unless the recorded data includes coherent energy at low frequencies, such as less than 2 Hertz (Hz). However, according to at least one embodiment of the present disclosure, low wavenumber components can be updated in the velocity model at greater depths.

The present disclosure provides several advantages over some previous approaches to updating velocity models. For example, a decomposed FWI gradient can be used to suppress high wavenumber components provided by reflected energy, such as migration isochrones, while preserving low wavenumber components in a velocity model. The decomposed inversion gradient can be an FWI gradient that is decomposed into separate wavenumber components, such as high and low wavenumber components. Thus, the decomposed FWI gradient can allow for updates of low wavenumber components in the velocity model at depths greater than a penetration depth of recorded refracted energy. With the low-wavenumber updates, FWI can produce a higher resolution velocity model, which may be useful to determine a property of a subsurface, such as the presence of a reservoir that may contain hydrocarbons.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 126 may reference element "26" in FIG. 1, and a similar element may be referenced as 226 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. Such processing can include updating the low-wavenumber (long wavelength) components of a velocity model by suppressing high wavenumber components of the velocity model with a decomposed FWI gradient. The low wavenumber components can be preserved in the velocity model by inserting dynamic weights in a velocity sensitivity kernel parameterized from a misfit function between modeled seismic data and recorded seismic data. In at least one embodiment, the processing can be used to determine a property of the subsurface based on the updated velocity model.

FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which seismic receivers may be coupled. In one type of marine survey, each seismic receiver, such as the seismic receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. The streamers 120 and the marine survey vessel 118 can include sensing electronics and data-processing facilities that allow seismic receiver readings to be correlated with absolute positions on the sea surface and absolute three-dimensional positions with respect to a three-dimensional coordinate system. In FIG. 1, the seismic receivers along the streamers are shown to lie below the sea surface 109, with the seismic receiver positions correlated with overlying surface positions, such as a surface position 124 correlated with the position of seismic receiver 122. The marine survey vessel 118 can also tow one or more seismic sources 126 that produce signals as the marine survey vessel 118 and streamers 120 move across the sea surface 109. Seismic sources 126 and/or streamers 120 may also be towed by other vessels, or may be otherwise disposed in fluid volume 108. For example, seismic receivers may be located on ocean bottom cables or nodes fixed at or near the surface 104, and seismic sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on a towed streamer, an ocean bottom receiver cable, and/or an array of nodes.

FIG. 1 shows source energy illustrated as an expanding, spherical signal, illustrated as semicircles of increasing radius centered at the source 126, representing a down-going wavefield 128, following a signal emitted by the seismic source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
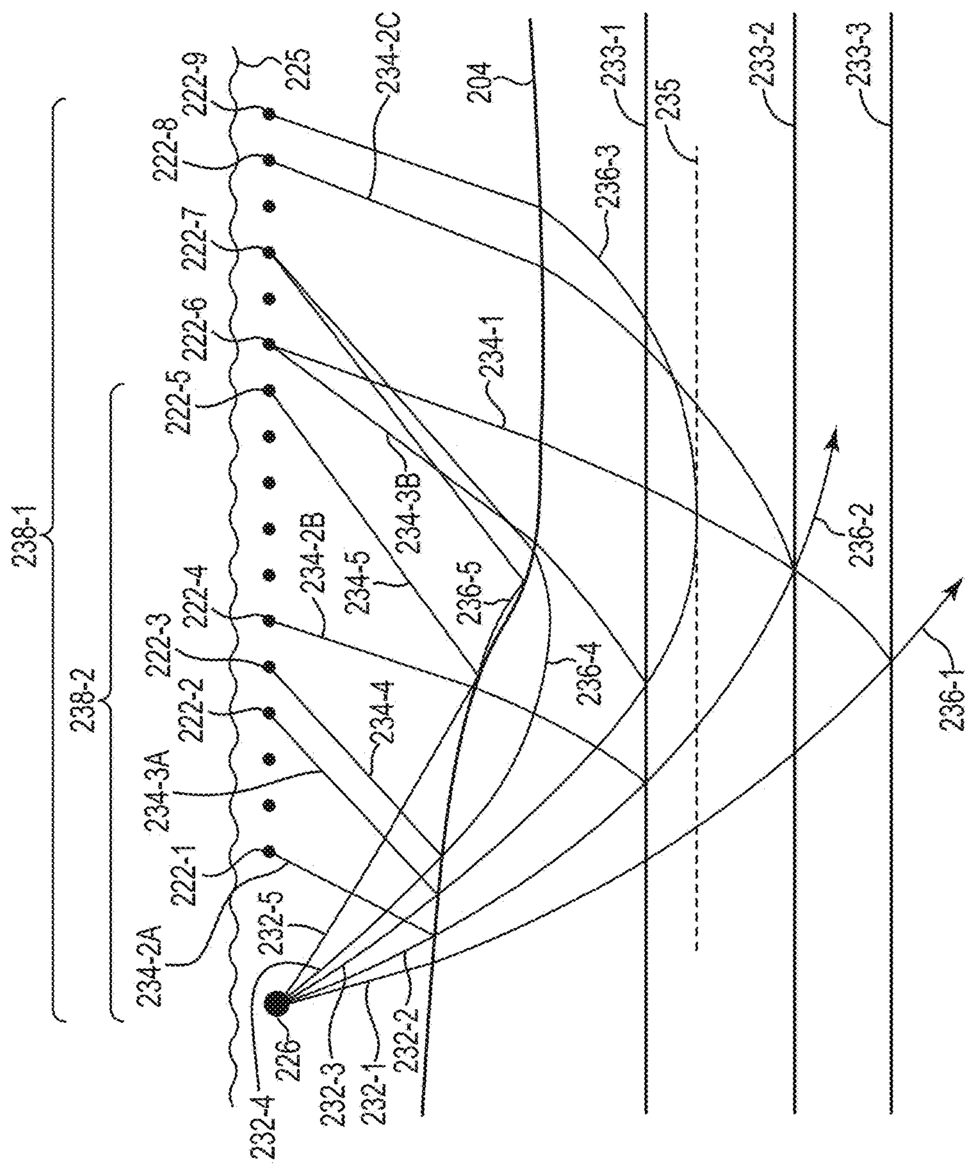
FIG. 2 illustrates an elevation or plane view of a state representing marine seismic surveying including source energy, reflected energy, and refracted energy.

FIG. 2 illustrates an elevation or plane view of a state representing marine seismic surveying including source energy, reflected energy, and refracted energy. The state can include a sea surface 225, a solid surface 204, and a plurality of subsurface reflectors 233-1, 233-2, 233-3, referred to generally herein as subsurface reflectors 233, underlying the solid surface 204. The state can include a seismic source 226 that can emit source energy such as a down-going source wavefield represented as a first down-going ray 232-1, a second down-going ray 232-2, a third down-going ray 232-3, a fourth down-going ray 232-4, and a fifth down-going ray 232-5. The state can include a plurality of seismic receivers 222-1, 222-2, 222-3, 222-4, 222-5, 222-6, 222-7, 222-8, 222-9 referred to generally herein as seismic receivers 222.

A portion of the energy from the first down-going ray 232-1 can reflect off of the third subsurface reflector 233-3 as reflected energy represented as up-going ray 234-1, which can be received by the seismic receiver 222-6. A portion of the energy from the second down-going ray 232-2 can reflect off of the solid surface 204 as reflected energy represented as up-going ray 234-2A, which can be received by the seismic receiver 222-1. A portion of the energy from the second down-going ray 232-2 can continue through the solid surface 204 and reflect off the first sub-surface reflector 233-1 as reflected energy represented as up-going ray 234-2B, which can be received by the seismic receiver 222-4. A portion of the energy from the second down-going ray 232-2 can continue through the first subsurface reflector 233-1 and reflect off of the second subsurface reflector 233-2 as reflected energy represented as up-going ray 234-2C, which can be received by the seismic receiver 222-8. A portion of the energy from the third down-going ray 232-3 can reflect off of the solid surface 204 as reflected energy represented as up-going ray 234-3A, which can be received by the seismic receiver 222-2. A portion of the energy from the third down-going ray 232-3 can pass through the solid surface 204 and reflect off of the first subsurface reflector 233-1 as reflected energy represented as up-going ray 234-3B, which can be received by the seismic receiver 222-6. A portion of the energy from the fourth down-going ray 232-4 can reflect off of the solid surface 204 as reflected energy represented as up-going ray 234-4, which can be received by the seismic receiver 222-3. The fifth down-going ray 232-5 can reflect off of the solid surface 204 as reflected energy represented as up-going ray 234-5, which can be received by the seismic receiver 222-5. The down-going rays 232 and the up-going rays 234 in the water between the sea surface 225 and the solid surface 204 generally follow a straight path as the acoustic velocity is nearly constant in the water. The ray paths below the solid surface 204 curve or bend back toward the surface because the velocities below the solid surface 204 vary and tend to increase with depth.

In addition to reflected energy at impedance steps within the subsurface, FIG. 2 illustrates refracted energy having ray paths that change from down-going to up-going by a gradual velocity change, referred to as a velocity gradient. Such waves are generally referred to herein as diving waves or turning waves. A diving wave is the portion of refracted energy that continues as a down-going wave after a refraction. A turning wave is the portion of refracted energy that continues as an up-going wave after a refraction. Diving waves and turning waves may be generally referred to herein as refracted energy. Refracted energy can be useful in locating reservoirs, such as steeply dipping reservoirs truncating against overhanging flanks, which may be associated with salt domes. FWI can use other refracted energy, such as head waves, which are waves that enter a high velocity medium and leave up to the surface at a critical angle. Head waves may be common in a medium with sharp boundaries. FIG. 2 illustrates diving waves that originate as source energy and become refracted energy (turning waves) after encountering a strong velocity gradient.

Specifically, FIG. 2 illustrates a portion of the energy from the first down-going ray 232-1 passing through the third subsurface reflector 233-3 as refracted energy represented as ray path 236-1. A portion of the energy from the second down-going ray 232-2 can pass through the second subsurface reflector 233-2 as refracted energy represented as ray path 236-2. The ray paths 236-1 and 236-2 would eventually bend back toward the surface, but it would reach the surface too far away to be recorded by the seismic receivers 222. A portion of the energy from the third down-going ray 232-3 can pass through the first subsurface reflector 233-1 and bend back toward the surface as refracted energy represented as ray path 236-3, which can be received by seismic receiver 222-9. A portion of the energy from the fourth down-going ray 232-4 can pass through the solid surface 204 and bend back toward the surface as refracted energy represented as ray path 236-4, which can be received by seismic receiver 222-7. Depending on velocities on either side of a boundary and an angle of incidence, energy may refract along a boundary rather than be transmitted through it. For example, a portion of the energy from the fifth down-going ray 232-5 can refract along a boundary in the solid surface 204 and eventually return toward the surface 225 as represented by ray path 236-5, which can be received by seismic receiver 222-7.

A first offset 238-1 is illustrated from the seismic source 226 to the seismic receiver 222-9. A second offset 238-2 is illustrated from the seismic source 226 to the seismic receiver 222-5. The offsets can be in an inline direction or in a crossline direction. The inline direction is generally in line with the direction of travel of the marine survey vessel from the seismic source 226 along a length of a streamer. The crossline direction is generally perpendicular to the direction of travel of the marine survey vessel from the seismic source 226 across a spread of streamers. Offsets may be considered "long" relative to the depth of the imaging target. Data acquired with offsets three times (or more) greater than the depth of the imaging target is considered long-offset data. Refracted energy is recorded at long offsets. The longer the offset, the deeper the penetration of the refracted energy that is able to be recorded at given source-receiver distances. The last seismic receiver illustrated is 222-9, which receives the refracted energy represented as ray path 236-3. The turning ray that reaches the last receiver generally has the maximum depth of penetration for transmitted energy that is recorded. In the example of FIG. 2, the maximum depth of penetration is illustrated at 235 for the refracted energy represented as ray path 236-3 that originated from the third down-going ray 232-3. Deeper penetrating rays (such as ray paths 236-1 and 236-2) still tend to bend back toward the surface, but reach the surface too far away to be recorded. However, rays at these depths may be reflected back to receivers for recording (such as is illustrated by up-going rays 234-1 and 234-2C).

From a given location, reflected energy at a shorter offset is generally received before reflected energy at a longer offset. For example, from the solid surface 204, the reflected energy represented as up-going ray 234-2A is received by the seismic receiver 222-1 at a shorter offset and before the reflected energy represented as up-going ray 234-3A is received by seismic receiver 222-2. In some instances, a reflector may also operate as a refractor. From a given location, reflected energy is generally received before refracted energy. For example, from the first subsurface reflector 233-1, the reflected energy represented as up-going ray 234-3B is received by the seismic receiver 222-6 at a shorter offset and before the refracted energy represented as ray path 236-3 is received by seismic receiver 222-9. For deeper targets and/or shorter offsets, processing of seismic data may have to rely on reflections rather than refractions. For example, if the offset was limited to the second offset 238-2 (e.g., if the seismic receivers 222-6 through 222-9 were not included in the marine survey), the subsurface reflector 233-1 could be imaged with the use of the reflected energy represented as up-going rays 234-2B and 234-3B, but not with the refracted energy represented as ray path 236-3. In some instances, there may be refractions without reflections. A hard interface is not needed to cause a refraction.

FWI can solve a nonlinear inverse problem by matching modeled seismic data to recorded seismic data. The matching can be quantified by the residuals of a least-squares misfit function. The velocity model update can be computed as a scaled representation of its FWI gradient. The misfit function can be parameterized in terms of bulk modulus (κ) and density (ρ), where the bulk modulus and density are parameters of the parameterized misfit function. Parameterizing the misfit function for a particular parameter represents the misfit function in terms of the particular parameter. A sensitivity kernel for a particular parameter measures the variation in the misfit function caused by a change in that parameter while holding the others fixed. In the case of an isotropic acoustic medium, a bulk modulus sensitivity kernel is defined as:

$$K_\kappa(x) = \frac{1}{\kappa(x)}\int \frac{\partial S(x,t)}{\partial t}\frac{\partial R(x,T-t)}{\partial t}dt \quad (1)$$

and a density sensitivity kernel is defined as:

$$K_\rho(x) = \frac{1}{\rho(x)}\int \nabla S(x,t)\cdot\nabla R(x,T-t)dt \quad (2)$$

where: t is time; T is the maximum recorded time; x is a position in three dimensions (x, y, z); $\kappa(x)=\rho(x)\upsilon^2(x)$ is the equation that relates the bulk modulus to velocity (v); S(x,t) is the source wavefield as a function of position and time; and R(x,t) is the residual wavefield as a function of position and time, which is the difference between the modeled and recorded wavefields.

FIG. 3A illustrates an FWI gradient, which is used to produce a velocity update, computed from a bulk modulus sensitivity kernel. In FIG. 3A, the velocity update can be produced for a model consisting of a single homogeneous layer overlying a half-space. The bulk modulus sensitivity kernel corresponds to Equation 1. FIG. 3B illustrates an FWI gradient computed using a density sensitivity kernel for the same model as FIG. 3A. The density sensitivity kernel corresponds to Equation 2. The locations of a seismic source 326 and a seismic receiver 322 are illustrated. The FWI gradients include low wavenumber components 340 and high wavenumber components 342. The low wave number components 340 are the result of cross-correlation of the down-going wavefields (forward and backward wavefields) and the backscattering produced by a sharp interface. The low wavenumber components 340 may be referred to as "rabbit ears." Low wavenumber components correspond to long wavelength features of the velocity model. The high wavenumber components 342 may be referred to as a migration isochrone or migration "smile" and correspond to specular reflections. High wavenumber components correspond to short wavelength features of the velocity model and may be provided by reflected energy. According to at least one embodiment of the present disclosure, a robust FWI gradient can be built for velocity model updates, such as macro velocity model updates. A macro velocity model update is a velocity model update pertaining to low wavenumbers (long wavelengths).

A velocity sensitivity kernel is defined as:

$$K_v(x)=K_\kappa(x)-K_\rho(x) \quad (3)$$

and an impedance (Z) sensitivity kernel is defined as:

$$K_Z(x)=K_\kappa(x)+K_\rho(x) \quad (4).$$

The impedance kernel isolates the high wavenumber components and the velocity kernel corresponds to the low wavenumber components. The impedance kernel can be useful for migration, such as reverse time migration (RTM), where a high resolution model is desirable and the velocity is fixed. A migration process can assume that the data represents primary reflected energy. Primary reflected energy is source energy that has undergone only one reflection from the subsurface. Interference between the reflected energy and the down-going forward and backward wavefields (low wavenumber components 340), or interference of the forward and backward refracted energy (such as is illustrated at 436 in FIGS. 4A-4B) is considered noise in a seismic image.

The velocity kernel can be useful for estimating a velocity model using FWI, where the low wavenumber components of the gradient are desirable and the high wavenumber components may be problematic as described above with respect to migration isochrones. An FWI gradient can be derived by dynamically weighting the velocity sensitivity kernel. The dynamic weights can be used to suppress the high wavenumber components from the FWI gradient in a heterogeneous media. As used herein suppression of high wavenumber components means that the high wavenumber components are significantly reduced and/or removed. Assuming constant density, the FWI gradient can be expressed as:

$$G(x) = \frac{1}{2A(x)}\left\{\int_t\left[W_1(x,t)\frac{1}{v^2(x)}\frac{\partial S(x,t)}{\partial t}\frac{\partial R(x,T-t)}{dt} - W_2(x,t)\nabla S(x,t)\cdot\nabla R(x,T-t)\right]\right\} \quad (5)$$

where $W_1(x, t)$ and $W_2(x, t)$ are the dynamic weights and A(x) is an illumination term.

FIG. 3C illustrates an FWI gradient produced with a dynamically weighted velocity sensitivity kernel for the same model as FIGS. 3A and 3B. The velocity sensitivity kernel corresponds to Equation 3 and the FWI gradient computation using dynamic weights corresponds to Equation 5. The locations of a seismic source 326 and a seismic receiver 322 are illustrated. The image illustrates that high wavenumber components are suppressed because the migration isochrone is no longer present. The image also illustrates that the low wavenumber components 340 is preserved and/or enhanced.

FIG. 4A illustrates an FWI gradient computed according to some previous approaches. In FIG. 4A, the FWI gradient can be produced for a model consisting of a single layer with a depth-variant velocity overlying a half-space. The locations of a seismic source 426 and a seismic receiver 422 are illustrated. The FWI gradient includes low wavenumber components 440 associated with the cross-correlation of the forward and backward refracted energy 436, which may be referred to in this context as diving waves. The cross-correlation of diving waves in the FWI gradient has a shape resembling a banana. The FWI gradient also includes high wavenumber components 442, such as a migration isochrone. The low wavenumber components 440 and the high wavenumber components 442 are associated with (or produced by) a subsurface reflector 433.

FIG. 4B illustrates an FWI gradient computed using a dynamically weighted velocity sensitivity kernel. The FWI gradient computation using the dynamically weighted velocity sensitivity kernel corresponds to Equation 5 according to at least one embodiment of the present disclosure. The locations of a seismic source 426, a seismic receiver 422, and a subsurface reflector 433 are illustrated. The image illustrates that high wavenumber components are suppressed because the migration isochrone is no longer present. The image also illustrates that the low wavenumber components 440 ("rabbit ears") and the correlated refracted energy 436 is preserved. In this example, the offset is 5 km and the depth is 4 km.

Figures 5A, 5B, 5C:
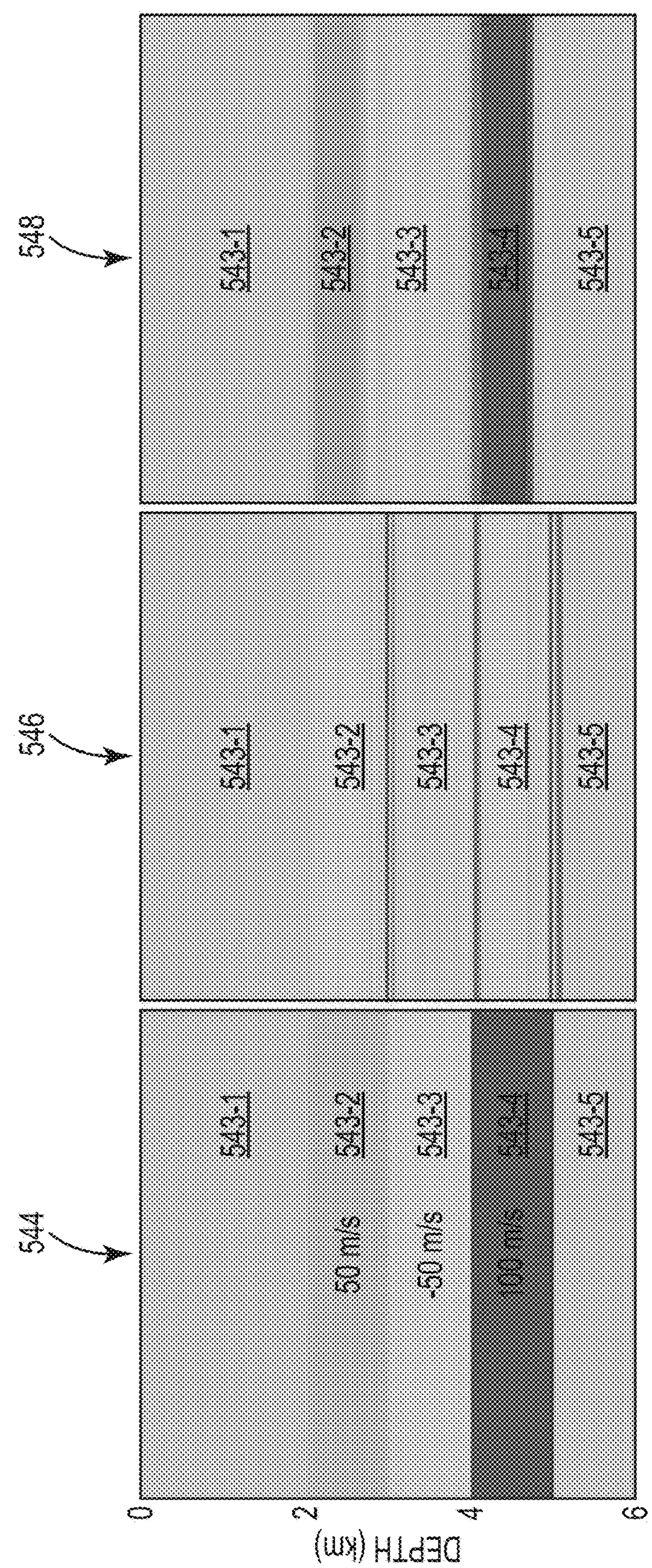
FIG. 5A illustrates the velocity differences 544 between a true velocity model and an initial estimate of the true velocity model.
FIG. 5B illustrates the velocity differences 546 for the five layers between the true velocity model and a velocity model from a full waveform inversion gradient computed according to some previous approaches.
FIG. 5C illustrates the velocity differences between the five layers between the true velocity model and a velocity model computed from a decomposed full waveform inversion gradient based on a dynamically weighted velocity sensitivity kernel.

FIG. 5A illustrates the velocity differences 544 between a true velocity model and an initial estimate of the true velocity model ("the initial velocity model"). The true velocity model can be a velocity model used to simulate the data input to the inversion. The velocity differences 544 include five layers 543-1, 543-2, 543-3, 543-4, 543-5 that are used as a reference to assess the performance of the inversion algorithm. The initial velocity model included errors up to 100 meters per second (m/s), as indicated by "50 m/s" in the second layer 543-2, by "−50 m/s" in the third layer 543-3, and by "100 m/s" in the fourth layer 543-4, as compared to the true velocity model. In this synthetic example, the offset is less than or equal to 4 km and the depth goes to 6 km. Therefore the reflections used in the inversion correspond to pre-critical angles. A critical angle is the angle of incidence above which total internal reflection occurs. The inversion is performed in a frequency band of 3-5 Hz.

FIG. 5B illustrates the velocity differences 546 for the five layers 543-1, 543-2, 543-3, 543-4, 543-5 between the true velocity model and an inverted velocity model computed from an FWI gradient according to some previous approaches. The update with the FWI gradient computation according to some previous approaches suffers from high wavenumber artifacts as illustrated by the solid lines between the five layers 543-1, 543-2, 543-3, 543-4, 543-5. Furthermore, the results of the update are not accurate as illustrated in FIG. 5B by the dissimilarity in the gradation of the five layers 543-1, 543-2, 543-3, 543-4, 543-5 of the velocity differences 546 as compared to the velocity differences 544 in the five layers 543-1, 543-2, 543-3, 543-4, 543-5 of FIG. 5A.

FIG. 5C illustrates the velocity differences 548 between the five layers 543-1, 543-2, 543-3, 543-4, 543-5 between the true velocity model and an inverted velocity model computed from a decomposed FWI gradient based on a dynamically weighted velocity sensitivity kernel. The decomposed FWI gradient computation based on a dynamically weighted velocity sensitivity kernel corresponds to Equation 5 according to at least one embodiment of the present disclosure. Results from the update with the decomposed FWI gradient computation based on a dynamically weighted velocity sensitivity kernel are accurate as illustrated by the similarity between the gradation of the five layers 543-1, 543-2, 543-3, 543-4, 543-5 of the velocity differences 548 in FIG. 5C and the gradation of the five layers 543-1, 543-2, 543-3, 543-4, 543-5 of the velocity differences 544 in FIG. 5A. Furthermore the velocity differences 548 do not suffer from high wavenumber artifacts.

Figures 6A, 6B, 6C:
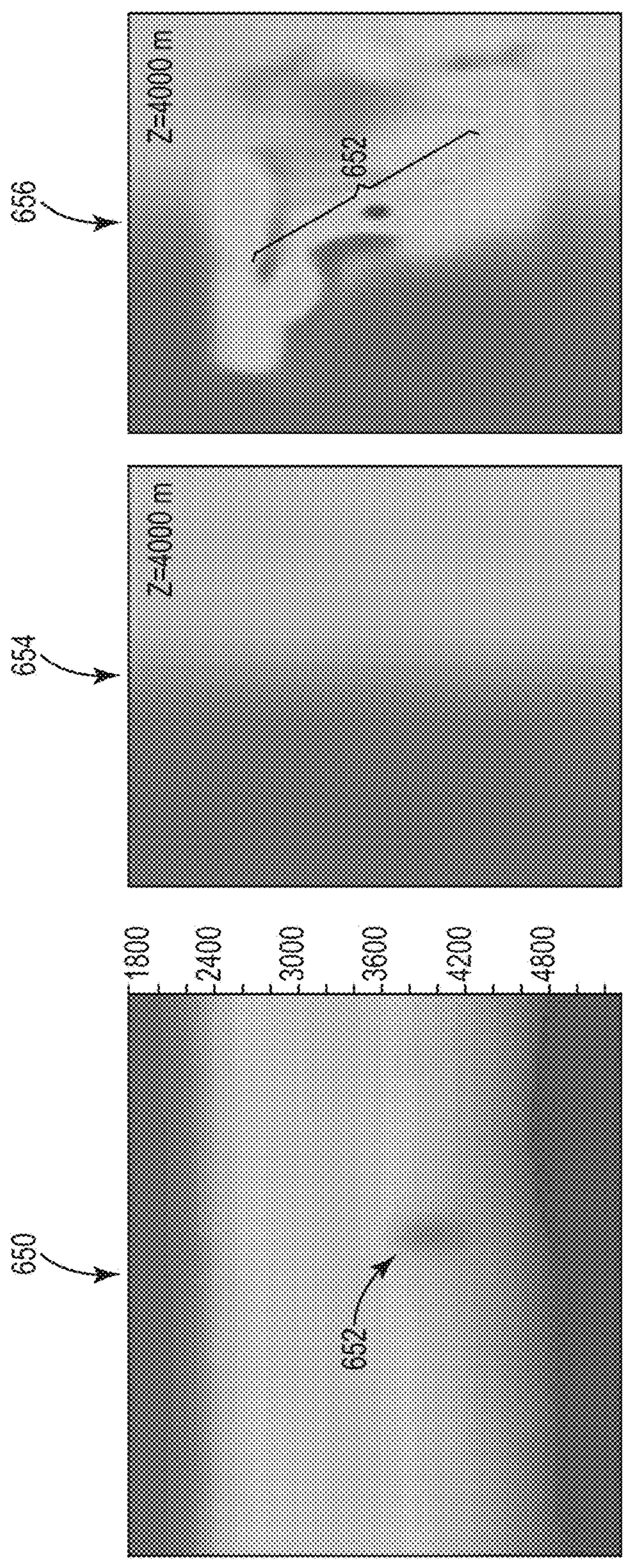
FIG. 6A illustrates an inline section of a true velocity model.
FIG. 6B illustrates a depth slice from an initial velocity model.
FIG. 6C illustrates a depth slice from an inverted velocity model computed from a decomposed full waveform inversion gradient based on a dynamically weighted velocity sensitivity kernel.

FIG. 6A illustrates an inline section 650 of a true velocity model. The true velocity model can be a velocity model used to generate synthetic data input to the inversion for a 3D synthetic example. The true velocity model is based on a real earth velocity model. It includes a smooth background velocity model that includes a meandering channel 652 at a 4 km depth. The offset in this example is less than or equal to 4 km and the inversion can be performed in a frequency band of 3-7 Hz.

FIG. 6B illustrates a depth slice 654 from an initial velocity model. The initial velocity model is the smooth background velocity model and does not include the meandering channel 652 illustrated in FIGS. 6A and 6C. The depth slice corresponds to a depth of 4 km.

FIG. 6C illustrates a depth slice 656 from an inverted velocity model computed from a decomposed FWI gradient based on a dynamically weighted velocity sensitivity kernel. The decomposed FWI gradient computation based on a dynamically weighted velocity sensitivity kernel corresponds to Equation 5 according to at least one embodiment of the present disclosure. The depth slice corresponds to a depth of 4 km. FIG. 6C illustrates that the channel 652 is nicely recovered using only reflections from the data with the offset limited to 4 km.

Figures 7A, 7B, 7C, 7D, 7E:
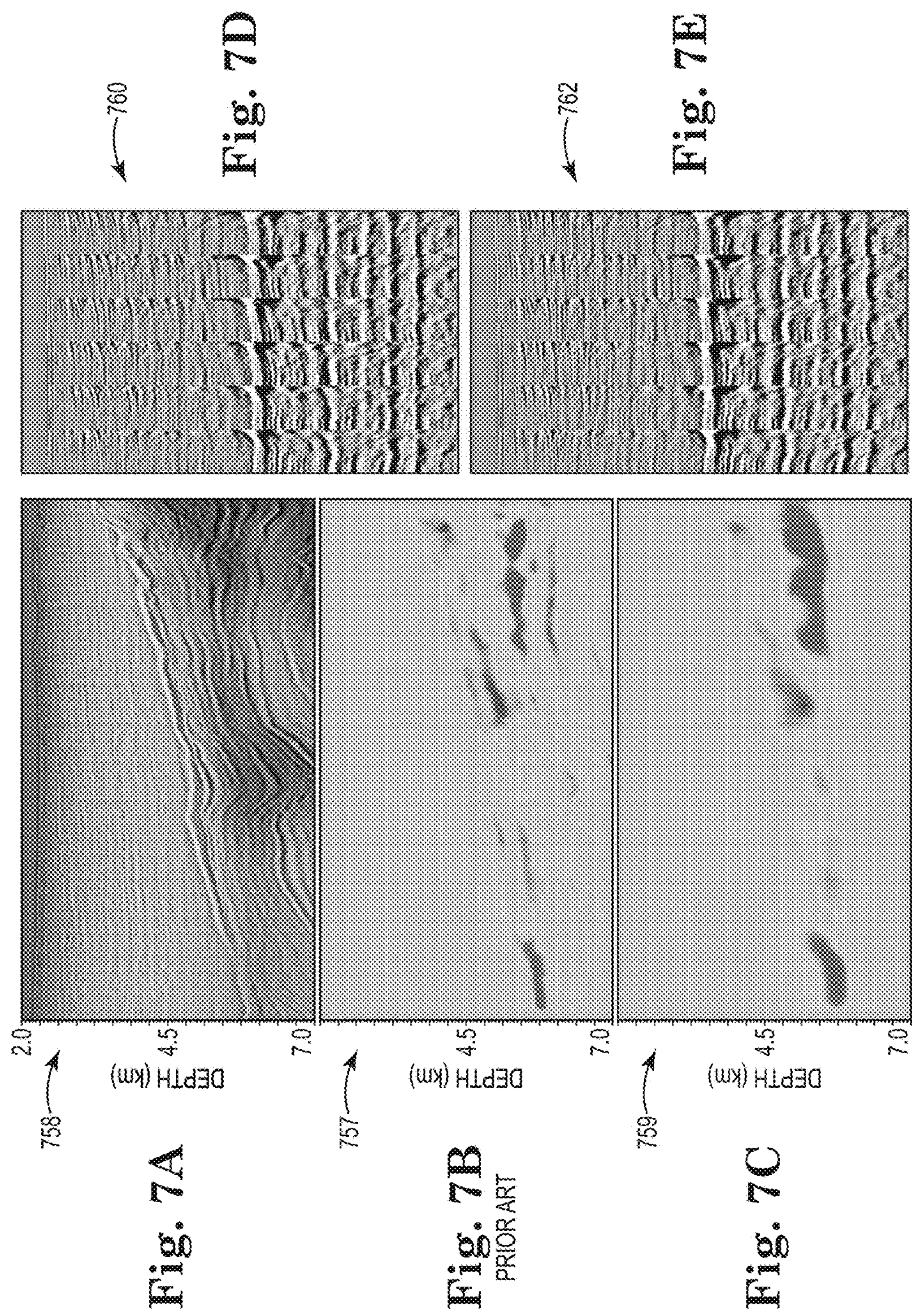
FIG. 7A illustrates an initial velocity model overlaid on a seismic migrated image computed with the initial velocity model.
FIG. 7B illustrates a velocity model update with a full waveform inversion gradient computation according to some previous approaches.
FIG. 7C illustrates a velocity model update with a decomposed full waveform inversion gradient computation based on a dynamically weighted velocity sensitivity kernel.
FIG. 7D illustrates several offset gathers computed from the initial velocity model.
FIG. 7E illustrates several offset gathers computed from the velocity model update with the decomposed full waveform inversion gradient computation based on a dynamically weighted velocity sensitivity kernel.

FIG. 7A illustrates an initial velocity model 758 overlaid on a seismic migrated image computed with the initial velocity model 758. The seismic image is based on recorded seismic data from deep water. The data was acquired with dual-sensor streamers and an offset less than or equal to 12 km. The frequency bandwidth used for inversion was 3-7 Hz. No particular mutes or event selection were used and therefore all of the recorded data was used in the inversion.

FIG. 7B illustrates a velocity model update 757 with an FWI gradient computation according to some previous approaches. The imprint of the seismic reflectivity is noticeable in the velocity model update 757, which may be referred to as an inverted velocity model. This is indicated by the observed "wiggly" behavior of the velocity model produced by the migration isochrones (high wavenumber information) that dominate the FWI gradient. This model is less geologically plausible and indicates that the updates are occurring only at the vicinity of the reflectors, and any errors in the background velocity model or macro velocity model are not corrected during the inversion. Consequently, the resolution of the migrated images computed from this model will not be improved and/or the depth location of the reflectors in the images will be incorrect.

FIG. 7C illustrates a velocity model update 759 with a decomposed FWI gradient computation based on a dynamically weighted velocity sensitivity kernel. The dynamically weighted velocity sensitivity kernel corresponds to Equation 5 according to at least one embodiment of the present disclosure. The velocity model update 759 shows a more geologically plausible model. The "wiggly" character of the inverted velocity model shown in FIG. 7B is not observed.

FIG. 7D illustrates several offset gathers 760 computed from the initial velocity model. FIG. 7E illustrates several offset gathers 762 computed from the inverted velocity model with the decomposed FWI gradient computation based on a dynamically weighted velocity sensitivity kernel. The offset gathers 762 illustrated in FIG. 7E have improved flatness as compared to the offset gathers 760 illustrated in FIG. 7D. This indicates that the inverted velocity model with the decomposed FWI gradient is more accurate overall than the initial velocity model. Consequently, the resolution of the migrated images computed from this model will be considerably improved.

Figure 8:
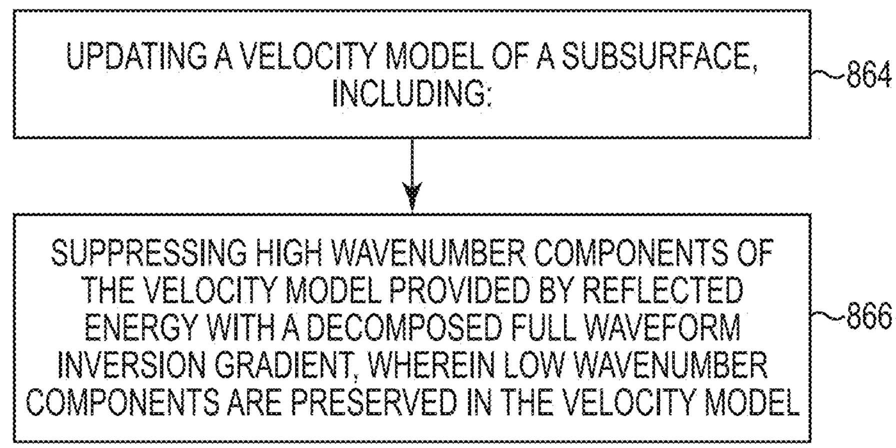
FIG. 8 illustrates a method flow diagram for a velocity model update with a full waveform inversion gradient.

FIG. 8 illustrates a method flow diagram for a velocity model update with an FWI gradient. At block 864, the method can include updating a velocity model of a subsurface. At block 866, updating a velocity model of a subsurface can include suppressing high wavenumber components of the velocity model provided by reflected energy with a decomposed FWI gradient, wherein low wavenumber components are preserved in the velocity model.

Updating the velocity model can include inserting dynamic weights in a velocity sensitivity kernel parameterized from a misfit function between modeled seismic data and recorded seismic data. Inserting dynamic weights can cause the suppression of the high wavenumber components. The high wavenumber components can be migration isochrones in at least one embodiment of the present disclosure. The method can include parameterizing the misfit function for velocity and impedance to yield the velocity sensitivity kernel. The method can include updating low wavenumber components of the velocity model beyond a penetration depth of refracted energy in the recorded seismic data.

In at least one embodiment, the method can include decomposing an FWI gradient into separate wavenumber components to yield the decomposed FWI gradient. The method can include determining a property of the subsurface based on the updated velocity model.

In accordance with a number of embodiments of the present disclosure, a geophysical data product may be produced. Geophysical data may be obtained and stored on a non-transitory, tangible computer-readable medium. The geophysical data product may be produced by processing the geophysical data offshore or onshore either within the United States or in another country. The processed data can be recorded on a non-transitory machine-readable medium thereby creating the geophysical data product. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, geophysical data can be obtained. The geophysical data can be processed by updating a velocity model of a subsurface, for example, as the geophysical data is being acquired or after it is acquired, offshore to facilitate other processing of the marine survey data either offshore or onshore. Updating the velocity model of the subsurface can include suppressing high wavenumber components of the velocity model with a decomposed FWI gradient, wherein low wavenumber components are preserved in the velocity model, for example, as the geophysical data is being acquired or after it is acquired, offshore to facilitate other processing of the marine survey data either offshore or onshore.

Figure 9:
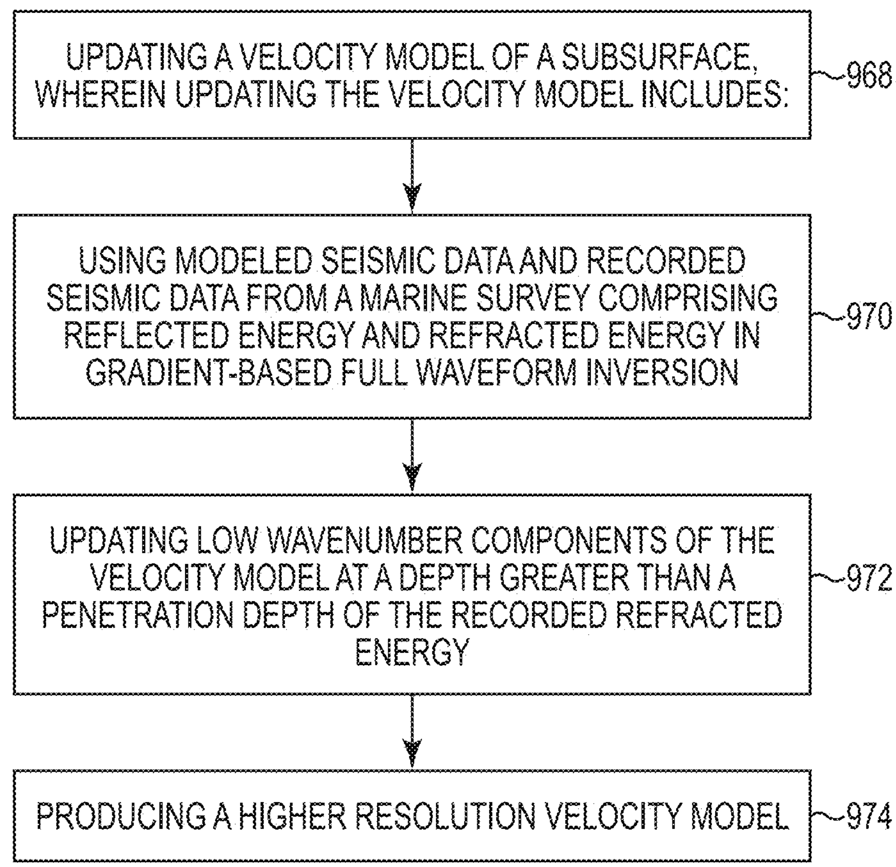
FIG. 9 illustrates a method flow diagram for a velocity model update with a full waveform inversion gradient.

FIG. 9 illustrates a method flow diagram for a velocity model update with an FWI gradient. At block 968, the method can include updating a velocity model of a subsurface. At block 970, updating the velocity model can include using modeled seismic data and recorded seismic data from a marine survey comprising reflected energy and refracted energy in gradient-based FWI. The gradient-based FWI can further include using separate low and high wavenumber components of a decomposed FWI gradient.

At block 972, updating the velocity model can include updating low wavenumber components of the velocity model at a depth greater than a penetration depth of the recorded refracted energy. Updating the velocity model can include suppressing high wavenumber components of the velocity model. Updating the velocity model can include inserting dynamic weights in a velocity sensitivity kernel parameterized from a misfit function between the modeled seismic data and the recorded seismic data. At block 974, updating the velocity model can include producing a higher resolution velocity model.

Figure 10:
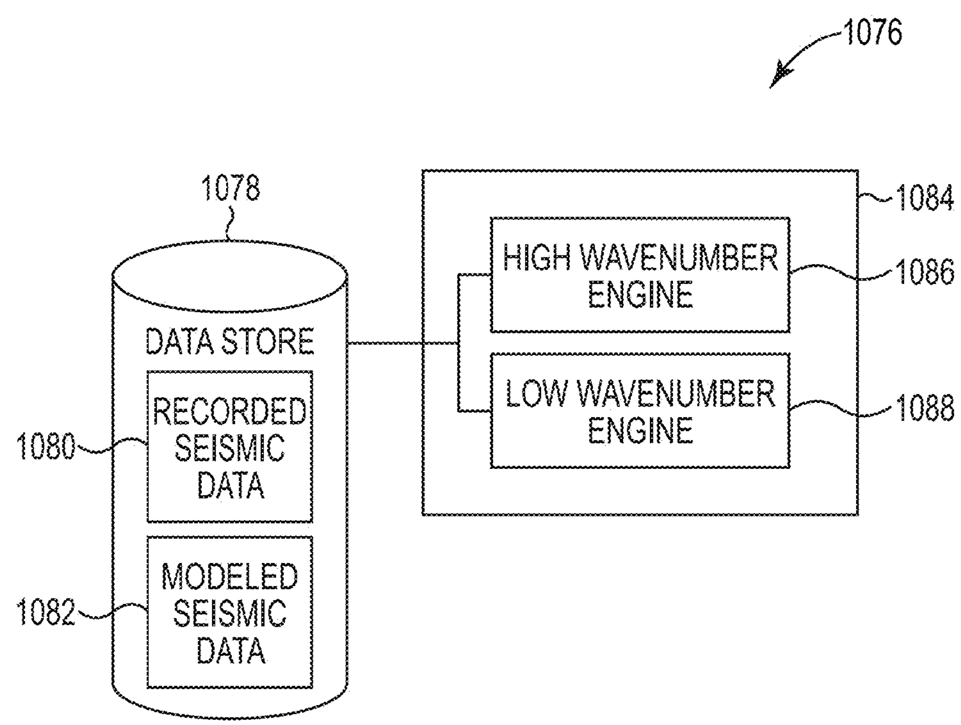
FIG. 10 illustrates a diagram of a system for a velocity model update with a full waveform inversion gradient.

FIG. 10 illustrates a diagram of a system 1076 for a velocity model update with an FWI gradient. The system 1076 can include a data store 1078, a subsystem 1084, and/or a number of engines (e.g., high wavenumber engine 1086 and/or low wavenumber engine 1088) and can be in communication with the data store 1078 via a communication link. The data store 1078 can store recorded seismic data 1080 from a marine survey and/or modeled seismic data 1082. In at least one embodiment, the recorded seismic data 1080 can be data recorded with offsets shorter than long offsets. In at least one embodiment, the recorded seismic data 1080 can be data recorded from deep water in which the targets are deeper than the penetration depth of the refracted waves. The system 1076 can include additional or fewer engines than illustrated to perform the various functions described herein. The system can represent program instructions and/or hardware of a machine (e.g., machine 1190 as referenced in FIG. 11, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, machine-readable medium, etc., as well as hard-wired program such as logic. Hard-wired program instructions can be considered as both program instructions and hardware.

The high wavenumber engine 1086 can include a combination of hardware and program instructions that is configured to suppress high wavenumber components in a velocity model with a decomposed FWI gradient based on a dynamically weighted velocity sensitivity kernel. The velocity sensitivity kernel can be a parameterization of a misfit function between the modeled seismic data 1082 and the recorded seismic data 1080. The high wavenumber engine can be configured to suppress migration isochrones corresponding to specular reflections in the velocity model.

The low wavenumber engine 1088 can include a combination of hardware and program instructions that is configured to update low wavenumber components of the velocity model to produce a higher resolution velocity model. Although not specifically illustrated, the system 1076 can include a subsurface property engine that can include a combination of hardware and program instructions that is configured to determine a property of the subsurface based on the higher resolution velocity model. The low wavenumber engine 1088 can be configured to update the low wavenumber components beyond a penetration depth of refracted energy in the recorded seismic data.

Figure 11:
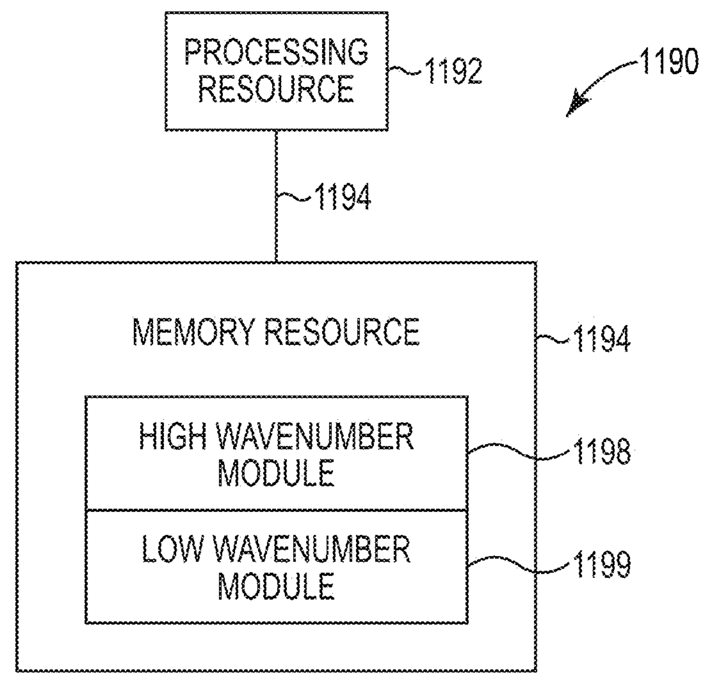
FIG. 11 illustrates a diagram of a machine for a velocity model update with a full waveform inversion gradient.

FIG. 11 illustrates a diagram of a machine for a velocity model update with an FWI gradient. The machine 1190 can utilize software, hardware, firmware, and/or logic to perform a number of functions. The machine 1190 can be a combination of hardware and program instructions configured to perform a number of functions (e.g., actions). The hardware, for example, can include a number of processing resources 1192 and a number of memory resources 1194, such as a machine-readable medium or other non-transitory memory resources 1194. The memory resources 1194 can be internal and/or external to the machine 1190, for example, the machine 1190 can include internal memory resources and have access to external memory resources. The program instructions, such as machine-readable instructions, can include instructions stored on the machine-readable medium to implement a particular function, for example, an action such as updating a velocity model with an FWI gradient. The set of machine-readable instructions can be executable by one or more of the processing resources 1192. The memory resources 1194 can be coupled to the machine 1190 in a wired and/or wireless manner. For example, the memory resources 1194 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 1194 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 1192 can be coupled to the memory resources 1194 via a communication path 1196. The communication path 1196 can be local or remote to the machine 1190. Examples of a local communication path 1196 can include an electronic bus internal to a machine, where the memory resources 1194 are in communication with the processing resources 1192 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1196 can be such that the memory resources 1194 are remote from the processing resources 1192, such as in a network connection between the memory resources 1194 and the processing resources 1192. That is, the communication path 1196 can be a network connection. Examples of such a network connection can include a local area network, wide area network, personal area network, and the Internet, among others.

As shown in FIG. 11, the machine-readable instructions stored in the memory resources 1194 can be segmented into a number of modules 1198, 1199 that when executed by the processing resources 1192 can perform a number of functions. As used herein a module includes a set of instructions included to perform a particular task or action. The number of modules 1198, 1199 can be sub-modules of other modules. For example, the high wavenumber module 1198 can be a sub-module of the low wavenumber module 1199 and/or the high wavenumber module 1198 and the low wavenumber module 1199 can be contained within a single module. Furthermore, the number of modules 1198, 1199 can comprise individual modules separate and distinct from one another. Examples are not limited to the specific modules 1198, 1199 illustrated in FIG. 11.

Each of the number of modules 1198, 1199 can include program instructions and/or a combination of hardware and program instructions that, when executed by a processing resource 1192, can function as a corresponding engine as described with respect to FIG. 10. For example, the high wavenumber module 1198 can include program instructions and/or a combination of hardware and program instructions that, when executed by a processing resource 1192, can function as the high wavenumber engine 1086 and/or the low wavenumber module 1199 can include program instructions and/or a combination of hardware and program instructions that, when executed by a processing resource 1192, can function as the low wavenumber engine 1088.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

updating, by a machine, a velocity model of a subsurface, including:

suppressing high wavenumber components of the velocity model provided by reflected energy with a decomposed full waveform inversion gradient, wherein low wavenumber components are preserved in the velocity model and updated beyond a penetration depth of refracted energy in recorded seismic data; and inserting dynamic weights in a velocity sensitivity kernel parameterized from a misfit function between modeled seismic data and the recorded seismic data.

2. The method of claim 1, wherein inserting the dynamic weights causes the suppression of the high wave number components of the velocity model provided by the reflected energy, wherein the high wavenumber components comprise migration isochrones.

3. The method of claim 1, wherein the method includes parameterizing the misfit function for velocity and impedance to yield the velocity sensitivity kernel.

4. The method of claim 1, wherein the method includes decomposing a full waveform inversion gradient into separate wavenumber components to yield the decomposed full waveform inversion gradient.

5. The method of claim 1, wherein the method includes determining a property of the subsurface based on the updated velocity model.

6. A system, comprising:

modeled seismic data;

recorded seismic data;

a high wavenumber engine, comprising hardware, configured to suppress high wavenumber components of a velocity model with a decomposed full waveform inversion gradient based on a dynamically weighted velocity sensitivity kernel; and a low wavenumber engine, comprising hardware, configured to update low wavenumber components of the velocity model beyond a penetration depth of refracted energy in the recorded seismic data to produce a more accurate velocity model;

wherein the velocity sensitivity kernel comprises a parameterization of a misfit function between the modeled seismic data and the recorded seismic data.

7. The system of claim 6, wherein the high wavenumber engine is configured to suppress migration isochrones, provided by the reflected energy, in the full waveform inversion gradient used to update the velocity model.

8. The system of claim 6, wherein the recorded seismic data comprises data recorded with offsets shorter than long offsets.

9. The system of claim 8, wherein the recorded seismic data comprises data recorded from deep water.

10. The system of claim 6, wherein the system further includes a subsurface property engine configured to determine a property of the subsurface based on the more accurate velocity model.

11. A method, comprising:

updating, by a machine, a velocity model of a subsurface, wherein updating the velocity model includes:

using modeled seismic data and recorded seismic data from a marine survey comprising reflected energy and refracted energy in gradient-based full waveform inversion;

inserting dynamic weights in a velocity sensitivity kernel parameterized from a misfit function between the modeled seismic data and the recorded seismic data;

updating low wavenumber components of the velocity model at a depth greater than a penetration depth of the recorded refracted energy; and producing a higher resolution velocity model.

12. The method of claim 11, wherein updating the velocity model further comprises suppressing high wavenumber components of the velocity model.

13. The method of claim 11, wherein the gradient-based full waveform inversion further comprises using separate low and high wavenumber components of a decomposed full waveform inversion gradient.

14. The method of claim 11, wherein updating the low wavenumber components of the velocity model comprises updating using reflected energy; and wherein the method further includes determining a property of the subsurface based on the updated velocity model.

15. A method of generating a geophysical data product, the method comprising:

obtaining geophysical data; and processing the geophysical data to generate processed data, wherein processing the geophysical data comprises:

updating, by a machine, a velocity model of a subsurface, including:

suppressing high wavenumber components of the velocity model with a decomposed full waveform inversion gradient, wherein low wavenumber components of the velocity model are preserved and updated beyond a penetration depth of refracted energy in recorded seismic data; and inserting dynamic weights in a velocity sensitivity kernel parameterized from a misfit function between modeled seismic data and recorded seismic data; and recording the processed data on a non-transitory machine-readable medium thereby creating the geophysical data product.

16. The method of claim 15, wherein processing the geophysical data comprises processing the geophysical data offshore or onshore.

* * * * *